United States Patent
Nagel et al.

(10) Patent No.: US 12,397,766 B2
(45) Date of Patent: Aug. 26, 2025

(54) SPINDLE DRIVE UNIT FOR AN ELECTROMECHANICAL BRAKE PRESSURE GENERATOR, ELECTROMECHANICAL BRAKE PRESSURE GENERATOR

(71) Applicant: Robert Bosch GmbH, Stuttgart (DE)

(72) Inventors: Willi Nagel, Remseck/Hochdorf (DE); Michael Osses, Heilbronn (DE); Sebastian Bauer, Bad Wimpfen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 284 days.

(21) Appl. No.: 17/796,260

(22) PCT Filed: Feb. 10, 2021

(86) PCT No.: PCT/EP2021/053144
§ 371 (c)(1),
(2) Date: Jul. 28, 2022

(87) PCT Pub. No.: WO2021/228443
PCT Pub. Date: Nov. 18, 2021

(65) Prior Publication Data
US 2023/0070222 A1    Mar. 9, 2023

(30) Foreign Application Priority Data
May 12, 2020   (DE) ............... 10 2020 205 968.3

(51) Int. Cl.
*B60T 13/74* (2006.01)
*B60T 7/04* (2006.01)
*B60T 13/68* (2006.01)

(52) U.S. Cl.
CPC ............ *B60T 13/745* (2013.01); *B60T 7/042* (2013.01); *B60T 13/686* (2013.01)

(58) Field of Classification Search
CPC ...... B60T 13/745; B60T 7/042; B60T 13/686; B60T 13/148; B60T 2270/82; B60Y 2400/81
See application file for complete search history.

(56) References Cited

U.S. PATENT DOCUMENTS 6,079,797 A   6/2000 Ganzel
9,982,662 B2 *  5/2018 Weh ............... B60T 8/4018
(Continued)

FOREIGN PATENT DOCUMENTS

DE   10255198 A1   7/2003
DE   202006014117 U1   2/2008
(Continued)

OTHER PUBLICATIONS

WO document No. WO 2020/216480 to Reichert et al. published on Oct. 29, 2020.*
(Continued)

*Primary Examiner* — Pamela Rodriguez
(74) *Attorney, Agent, or Firm* — NORTON ROSE FULBRIGHT US LLP

(57) ABSTRACT

A spindle drive unit for an electromechanical brake pressure generator in a hydraulic braking system of a vehicle for converting the rotational motion of a drive shaft of an electric motor into a translational motion of a piston that is coupled to the spindle drive unit. The spindle drive unit and/or the piston are/is enclosed, at least in sections, by an adapter sleeve having a male thread for screwing into a housing of the brake pressure generator. An electromechanical brake pressure generator that includes a spindle drive unit of this type is also described.

15 Claims, 3 Drawing Sheets

(56) References Cited

U.S. PATENT DOCUMENTS

| | | | | |
|---|---|---|---|---|
| 10,393,199 B2* | 8/2019 | Tandler | ................... | H02K 7/06 |
| 2020/0339091 A1* | 10/2020 | Boehm | ................... | F16H 25/20 |
| 2020/0340563 A1* | 10/2020 | Boehm | ................. | B60T 8/3255 |
| 2022/0112888 A1* | 4/2022 | Weh | ..................... | B60T 13/745 |

FOREIGN PATENT DOCUMENTS

| | | |
|---|---|---|
| DE | 102007043984 A1 | 8/2008 |
| DE | 102017126006 A1 | 1/2019 |
| JP | H10194112 A | 7/1998 |
| JP | 2017096313 A | 6/2017 |
| JP | 2017521324 A | 8/2017 |

OTHER PUBLICATIONS

Translation of Japanese Patent No. JP 2017096313 to Oku et al.obtained from website: https://worldwide.espacenet.com on Nov. 19, 2024.*

International Search Report for PCT/EP2021/053144, Issued May 26, 2021.

* cited by examiner

SPINDLE DRIVE UNIT FOR AN ELECTROMECHANICAL BRAKE PRESSURE GENERATOR, ELECTROMECHANICAL BRAKE PRESSURE GENERATOR

FIELD

The present invention relates to a spindle drive unit for an electromechanical brake pressure generator in a hydraulic braking system of a vehicle. By use of the spindle drive unit according to the present invention, a rotational motion of a drive shaft of an electric motor may be converted into a translational motion of a piston that is coupled to the spindle drive unit.

Moreover, the present invention relates to an electromechanical brake pressure generator that includes a spindle drive unit according to the present invention. The electromechanical brake pressure generator is intended to be usable not only for providing an auxiliary brake force, but also in so-called "brake-by-wire" systems for exclusive generation of the brake force. In this embodiment, the electromechanical brake pressure generator may be used in particular for brake force or brake pressure generation in autonomously traveling vehicles.

BACKGROUND INFORMATION

A spindle drive unit for an electromechanical brake pressure generator is typically situated, together with the electric motor, in a shared housing. The drive shaft of the electric motor may be situated axially parallel or coaxially with respect to the piston. For an axially parallel arrangement, the axial distance between the drive shaft and the spindle drive unit is bridged with the aid of a gear mechanism. In addition to a first gearwheel or pinion that is coupled to the drive shaft, and a second gearwheel that is coupled to the spindle drive, the gear mechanism may include an intermediate wheel. The intermediate wheel allows the diameter of the first and second gearwheels to be decreased. In addition, an electronics system, valves, and/or sensors of the electromechanical brake pressure generator may be accommodated in the housing.

SUMMARY

An object underlying the present invention is to simplify the installation of an electromechanical brake pressure generator, in particular for an axially parallel arrangement of the drive shaft and the spindle drive. In addition, an arrangement having a particularly compact design is to be provided.

For achieving the object, a spindle drive unit and a electromechanical brake pressure generator according to the present invention are provided. Advantageous refinements of the present invention are disclosed herein.

In accordance with an example embodiment of the present invention, a spindle drive unit for an electromechanical brake pressure generator in a hydraulic braking system of a vehicle is provided, by use of which the rotational motion of a drive shaft of an electric motor is convertible into a translational motion of a piston that is coupled to the spindle drive unit. According to an example embodiment of the present invention, the spindle drive unit and/or the piston are/is enclosed, at least in sections, by an adapter sleeve having a male thread for screwing into a housing of the brake pressure generator.

The spindle drive unit, the piston, and the adapter sleeve may be preassembled, and as a preassembled module easily inserted or screwed into the housing of the brake pressure generator. As a preassembled module, the spindle drive unit according to the present invention may reduce the complexity of installing the brake pressure generator. This is accompanied by a cost advantage. At the same time, via the screw connection between the adapter sleeve and the housing, fixing of the preassembled module in the housing is achieved, which is capable of absorbing high tensile forces. At the same time, the fixing via the screw connection requires a comparatively small installation space in the radial direction, in particular in comparison to a clip connection, which requires a C ring as an additional component. As a result, for an axially parallel arrangement the axial distance between the spindle drive unit and the drive shaft of the electric motor may be reduced. This in turn allows an intermediate wheel to be dispensed with, thus saving further components.

In accordance with an example embodiment of the present invention, the spindle drive unit and the drive shaft preferably have an axially parallel arrangement, since the advantages of the present invention are particularly clearly apparent here.

In addition, in accordance with an example embodiment of the present invention, a roller bearing or ball bearing is preferably mounted on, preferably pressed onto, the adapter sleeve. The roller bearing or ball bearing thus forms a further component of the preassembled module, and together with the spindle drive unit may be inserted into the housing via the adapter sleeve and fixed in the housing. The press fit connection is preferably established via an inner ring of the roller bearing or ball bearing. The press fit of the roller bearing or ball bearing may also transmit tensile forces that act on the piston.

Furthermore, the roller bearing or ball bearing is preferably supported on a stop of the adapter sleeve in the axial direction, i.e., in the main force direction. In addition to establishing the press fit connection, the axial support also provides additional position securing. The adapter sleeve may include an annular collar, for example, for forming the stop. Alternatively, a clip ring may be used to form the stop.

In addition, in accordance with an example embodiment of the present invention, it is provided that the spindle drive unit includes a gearwheel for coupling to the drive shaft, preferably for directly or indirectly coupling to a pinion of the drive shaft. In this case, the gearwheel forms a further component of the preassembled module, thus further simplifying the installation of the brake pressure generator.

For forming a torque support, in accordance with an example embodiment of the present invention, it is provided that the adapter sleeve has an inner contour with at least one groove. In principle, the torque support is necessary in a spindle drive for converting the rotational motion of the drive shaft into a translational motion of the piston. To provide the torque support with a particularly robust design, the number of grooves may also be two, three, or four. The torque to be supported is then distributed over the multiple grooves. The grooves are advantageously situated at the same angular distance relative to one another in order to uniformly distribute the torque to be supported.

For forming the torque support, it is further proposed that a spindle or a spindle nut of the spindle drive unit has an outer contour with at least one wing that engages with the groove of the adapter sleeve. The at least one wing that engages with the groove of the adapter sleeve brings about a positive fit between the spindle or the spindle nut and the adapter sleeve in the rotational direction, thus achieving the torque support. For a driven spindle, the at least one wing is formed at the spindle nut. For a driven spindle nut, the spindle includes the at least one wing. Alternatively, it is proposed that the piston is rotatably fixedly connected to a spindle of the spindle drive unit, and has an outer contour with at least one wing that engages with the groove.

The number and the shape of the wings preferably correspond to the number and the shape of the grooves of the adapter sleeve, regardless of whether the wings are formed at the spindle, the spindle nut, or the piston. In addition, the wings are also preferably situated at the same angular distance relative to one another.

According to one preferred specific embodiment of the present invention, the adapter sleeve is made of metal, in particular steel or aluminum. A metallic material such as steel or aluminum allows the formation of a precisely fitting male thread, so that the desired fixing of the adapter sleeve and thus of the preassembled module in the housing is achievable. This applies in particular due to the fact that the housing is typically likewise made of a metallic material, in particular steel or aluminum.

In one refinement of the present invention, it is proposed that the drive-side end of the spindle drive unit includes a cap having at least one opening on the end-face side for the engagement of an installation tool. The cap may be used, for example, to captively hold individual, preferably all, components of the preassembled module together. This ensures that the module is insertable as a unit into the housing of the brake pressure generator. The installation of the brake pressure generator is thus further simplified. In addition, the cap protects the spindle drive unit from the penetration of harmful particles. For this purpose, the cap preferably includes a collar that encompasses not only the end of the spindle drive unit, but also the adapter sleeve and/or the roller bearing or ball bearing, at least in sections.

The number and the angular position of the at least one opening provided in the cap on the end-face side preferably correspond to the number and the angular position of the at least one groove of the adapter sleeve. The accessibility of the at least one groove of the adapter sleeve is thus ensured. This is because the installation tool must be inserted through the at least one opening of the cap on the end-face side and into the at least one groove of the adapter sleeve in order to screw the adapter sleeve or the preassembled module into the housing of the brake pressure generator.

Moreover, for achieving the object stated at the outset, an electromechanical brake pressure generator for a hydraulic braking system of a vehicle is provided which includes a spindle drive unit according to the present invention. The spindle drive unit is screwed, via the adapter sleeve, into a housing of the brake pressure generator, in which the electric motor is also accommodated. The spindle drive unit and a drive shaft of the electric motor preferably have an axially parallel arrangement. The advantages of the spindle drive unit according to the present invention are best achieved in this arrangement. In particular, an easily installed brake pressure generator having a compact design may be provided.

The spindle drive unit which is screwed into the housing via the adapter sleeve is advantageously secured against loosening of the screw connection by the rotational direction of the male thread of the adapter sleeve and/or by an additional safeguard against loosening, for example in the form of a coating of the male thread. In this way, the adapter sleeve and thus the preassembled module may be permanently fixed in the housing of the brake pressure generator. The additional safeguard against loosening may be implemented, for example, with the aid of a coating and/or an adhesive that are/is preferably applied to the male thread of the adapter sleeve before the adapter sleeve is screwed into the housing.

One preferred specific embodiment of the present invention is explained in greater detail below with reference to the figures.

DETAILED DESCRIPTION OF EXAMPLE EMBODIMENTS

Figure 1:
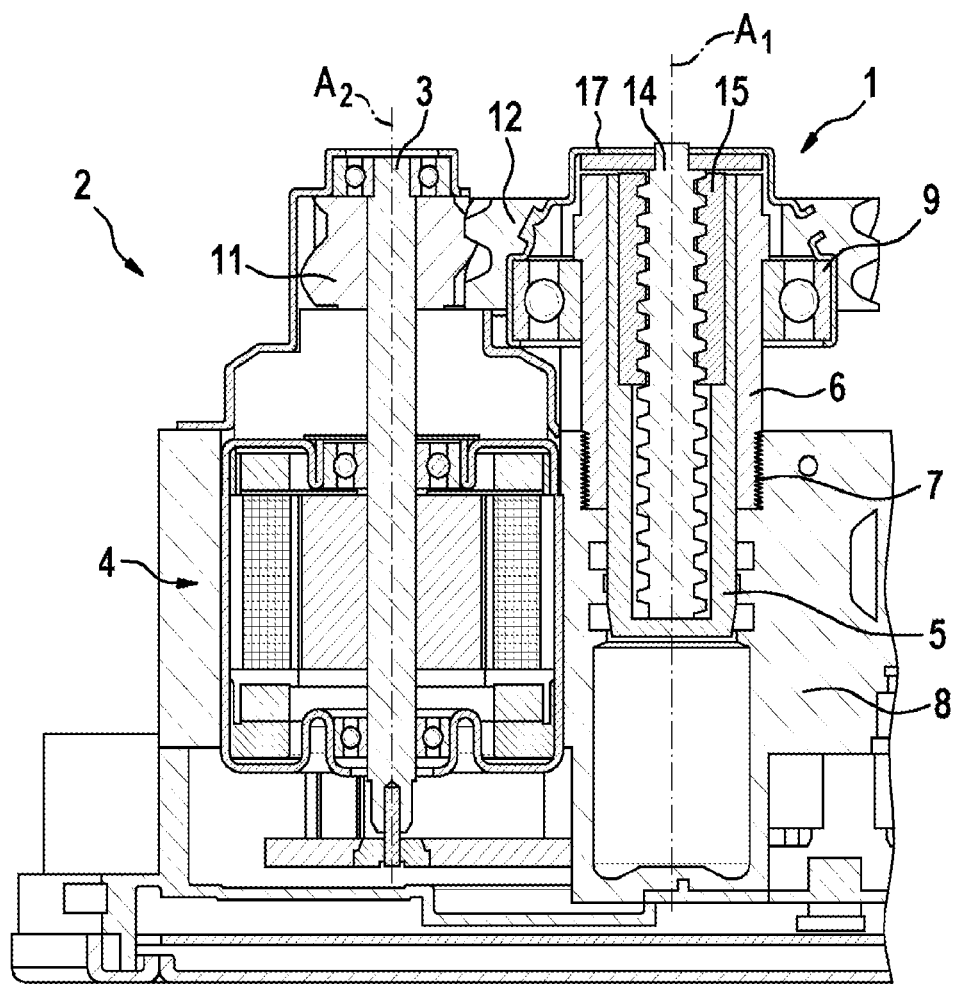
FIG. 1 shows a longitudinal section through an electromechanical brake pressure generator with a spindle drive unit according to an example embodiment of the present invention.

Electromechanical brake pressure generator 2 illustrated in FIG. 1 includes a housing 8 in which a spindle drive unit 1 according to the present invention with a piston 5, and an electric motor 4 with a drive shaft 3 are accommodated. Piston 5 and drive shaft 3 are situated axially parallel. That is, a longitudinal axis $A_1$ of piston 5 and a longitudinal axis $A_2$ of drive shaft 3 are aligned in parallel. In the present case, piston 5 is embodied as a hollow cylinder that is closed on the end-face side.

Drive shaft 3 is connected to a pinion 11 that meshes with a gearwheel 12 of the spindle drive unit 1, so that the rotational motion of drive shaft 3 is transferable to spindle drive unit 1. To convert the rotational motion of drive shaft 3 into a translational motion of piston 5, spindle drive unit 1 includes a spindle 14 and a spindle nut 15, which in the illustrated exemplary embodiment are accommodated in hollow cylindrical piston 5. Piston 5 in turn is enclosed, at least in sections, by an adapter sleeve 6 with a male thread 7, via which spindle drive unit 1 is screwed into housing 8 of brake pressure generator 2. Spindle drive unit 1 together with spindle 14 and spindle nut 15, piston 5, and adapter sleeve 6 form a module that is preassembled and inserted or screwed as a unit into housing 8 of brake pressure generator 2. At the same time, fixing of the module in housing 8 is ensured via the screw connection.

Figure 2A:
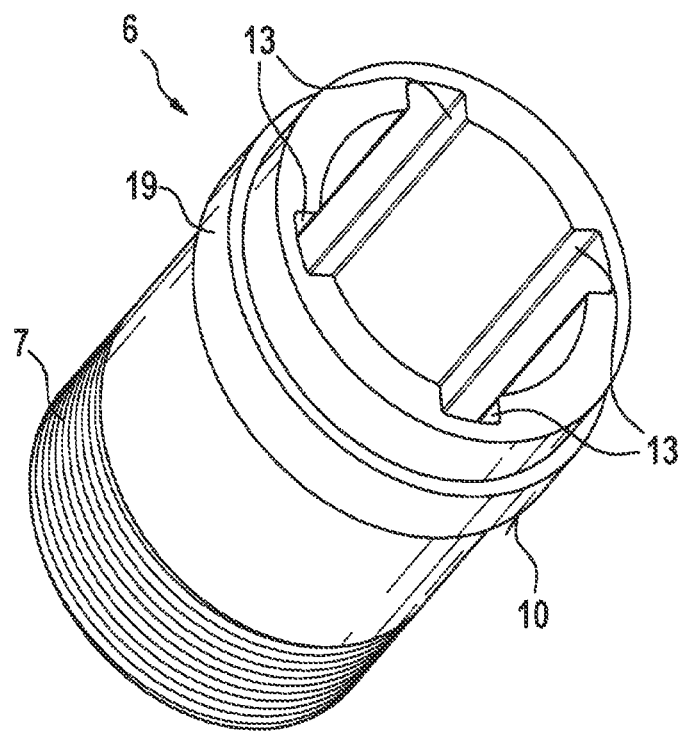
FIGS. 2A and 2B each show a perspective illustration of the adapter sleeve of the spindle drive unit in FIG. 1.
Figure 2B:
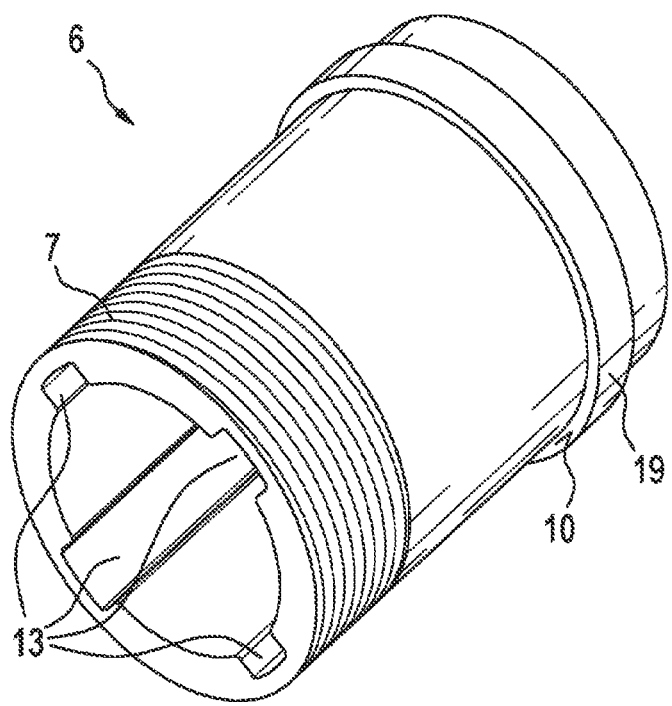

In the exemplary embodiment illustrated in FIG. 1, the preassembled module includes further components. These include a ball bearing 9 that is pressed onto adapter sleeve 6, and a cap 17. Ball bearing 9 pressed onto adapter sleeve 6 is supported on a stop 10 in the axial direction, which in the present case is formed by an annular collar 19 of adapter sleeve 6 (see also FIGS. 2A and 2B. Cap 17 encloses ball bearing 9 and the end of spindle drive unit 1 that protrudes from housing 8, so that the spindle drive unit is protected by cap 17. In addition, all components of the preassembled module are captively held by cap 17, which facilitates the insertion or screwing into housing 8. The screwing-in preferably takes place with the aid of an installation tool (not illustrated) which engages through openings 18 of cap 17 into grooves 13 of adapter sleeve 6 (see FIG. 2A and FIG. 4).

Figure 3:
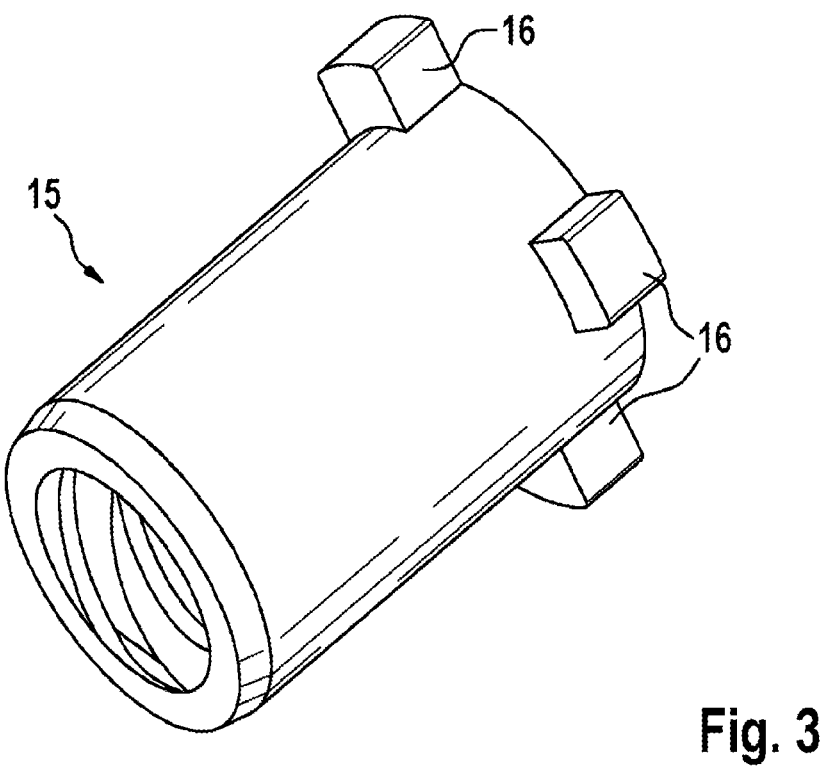
FIG. 3 shows a perspective illustration of the spindle nut of the spindle drive in FIG. 1.

At the same time, a torque support of spindle drive unit 1 is achieved via grooves 13 of adapter sleeve 6. For this purpose, spindle nut 15 has an outer contour with wings 16 (see FIG. 3) that engage with grooves 13 of adapter sleeve 6.

Figure 4:
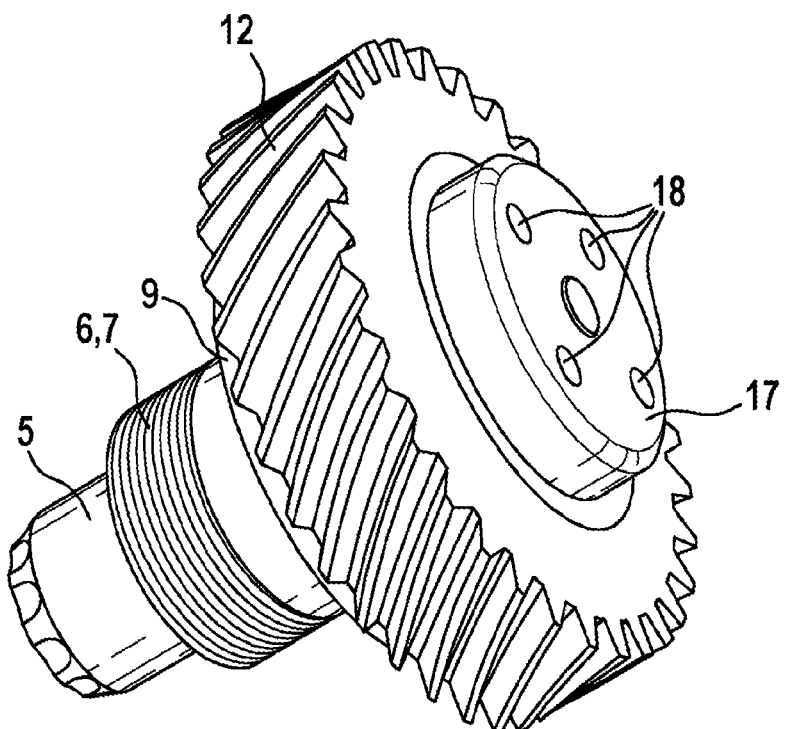
FIG. 4 shows a perspective illustration of the spindle drive unit in FIG. 1.

Spindle drive unit 1 according to the present invention, including all components of the preassembled module, is shown in a single illustration in FIG. 4. That is, the spindle drive unit may also include gearwheel 12.

What is claimed is:

1. A spindle drive unit for an electromechanical brake pressure generator in a hydraulic braking system of a vehicle for converting a rotational motion of a drive shaft of an electric motor into a translational motion of a piston that is coupled to the spindle drive unit, the spindle drive unit comprising:
   an adapter sleeve, an inner contour of which forms at least one groove as a torque support, the spindle drive unit and/or the piston being enclosed, at least in sections, by the adapter sleeve, the adapter sleeve having a male thread for screwing into a housing of the brake pressure generator;
   wherein the spindle drive unit includes at least one of the following features (I)-(II):
      (I) the piston is rotatably fixedly connected to a spindle of the spindle drive unit, and has an outer contour with at least one wing that engages with the groove; and
      (II) a drive-side end of the spindle drive unit includes a cap having at least one opening on an end-face side for the engagement of an installation tool, a number and angular position of the at least one opening corresponding to a number and angular position of the at least one groove of the adapter sleeve.

2. The spindle drive unit as recited in claim 1, wherein a roller bearing or ball bearing is mounted on and/or pressed onto, the adapter sleeve, the roller bearing or ball bearing being supported on a stop of the adapter sleeve in an axial direction.

3. The spindle drive unit as recited in claim 1, further comprising:
   a gearwheel configured to couple to the drive shaft.

4. The spindle drive unit as recited in claim 3, wherein the gearwheel is configured to directly or indirectly couple to a pinion of the drive shaft.

5. The spindle drive unit as recited in claim 1, wherein the at least one groove includes two or three or four grooves.

6. The spindle drive unit as recited in claim 1, wherein the spindle or a spindle nut of the spindle drive unit has the outer contour with the at least one wing that engages with the groove.

7. The spindle drive unit as recited in claim 1, wherein the piston is rotatably fixedly connected to the spindle of the spindle drive unit, and has the outer contour with the at least one wing that engages with the groove.

8. The spindle drive unit as recited in claim 1, wherein the adapter sleeve is made of metal.

9. The spindle drive unit as recited in claim 8, wherein the metal is steel or aluminum.

10. The spindle drive unit as recited in claim 1, wherein the drive-side end of the spindle drive unit includes the cap having the at least one opening on the end-face side for the engagement of the installation tool, the number and angular position of the at least one opening corresponding to the number and angular position of the at least one groove of the adapter sleeve.

11. An electromechanical brake pressure generator for a hydraulic braking system of a vehicle, comprising:
   a spindle drive unit for converting a rotational motion of a drive shaft of an electric motor into a translational motion of a piston that is coupled to the spindle drive unit, the spindle drive unit including an adapter sleeve, an inner contour of which forms at least one groove as a torque support, the spindle drive unit and/or the piston being enclosed, at least in sections, by the adapter sleeve, the adapter sleeve having a male thread for screwing into a housing of the brake pressure generator, the spindle drive unit being screwed, via the adapter sleeve, into the housing of the brake pressure generator, in which the electric motor is accommodated;
   wherein the spindle drive unit includes at least one of the following features (I)-(II):
      (I) the piston is rotatably fixedly connected to a spindle of the spindle drive unit, and has an outer contour with at least one wing that engages with the groove; and
      (II) a drive-side end of the spindle drive unit includes a cap having at least one opening on an end-face side for the engagement of an installation tool, a number and angular position of the at least one opening corresponding to a number and angular position of the at least one groove of the adapter sleeve.

12. The electromechanical brake pressure generator as recited in claim 11, wherein the spindle drive unit which is screwed into the housing via the adapter sleeve is secured against loosening of the screw connection by a rotational direction of the male thread of the adapter sleeve and/or by an additional safeguard against loosening in the form of a coating of the male thread.

13. The electromechanical brake pressure generator as recited in claim 11, wherein the piston is rotatably fixedly connected to the spindle of the spindle drive unit, and has the outer contour with the at least one wing that engages with the groove.

14. The electromechanical brake pressure generator as recited in claim 11, wherein the drive-side end of the spindle drive unit includes the cap having the at least one opening on the end-face side for the engagement of the installation tool, the number and angular position of the at least one opening corresponding to the number and angular position of the at least one groove of the adapter sleeve.

15. A method for assembling a spindle drive unit to an electromechanical brake pressure generator in a hydraulic braking system of a vehicle for converting a rotational motion of a drive shaft of an electric motor of the electromechanical brake pressure generator into a translational motion of a piston that is coupled to the spindle drive unit, the spindle drive unit comprising an adapter sleeve, the spindle drive unit and/or the piston being enclosed, at least in sections, by the adapter sleeve, the adapter sleeve having a male thread for screwing into a housing of the brake pressure generator, the method comprising:
   assembling (I) the piston, the spindle nut, and the spindle at least partially within an interior of the adapter sleeve, and (II) a gearwheel around the adapter sleeve, thereby providing a piston assembly; and
   subsequently connecting the piston assembly to the housing of the brake pressure generator by screwing the male thread into an opening in the housing of the brake pressure generator, thereby engaging the gearwheel of the piston assembly with a pinion of the brake pressure generator, the pinion being rotationally fixed to the drive shaft.

* * * * *